United States Patent
Balaji et al.

(10) Patent No.: US 11,144,537 B2
(45) Date of Patent: Oct. 12, 2021

(54) SYSTEM FOR DATA CONSENSUS VALIDATION IN AN ELECTRONIC DISTRIBUTED SERVER NETWORK USING A SCREENING NODE

(71) Applicant: Bank of America Corporation, Charlotte, NC (US)

(72) Inventors: Sujatha Balaji, Tamil Nadu (IN); Swapnil Sharma, Gujarat (IN); Sarath Kumar Navarajan, Tamil Nadu (IN); Sandhya Eranki, Tamil Nadu (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 161 days.

(21) Appl. No.: 16/571,500

(22) Filed: Sep. 16, 2019

(65) Prior Publication Data

US 2021/0081397 A1    Mar. 18, 2021

(51) Int. Cl.
*G06F 16/23*    (2019.01)
*G06F 21/62*    (2013.01)
*G06F 16/27*    (2019.01)

(52) U.S. Cl.
CPC ...... *G06F 16/2365* (2019.01); *G06F 16/2358* (2019.01); *G06F 16/275* (2019.01); *G06F 21/6218* (2013.01)

(58) Field of Classification Search
None
See application file for complete search history.

(56) References Cited

U.S. PATENT DOCUMENTS

| | | | |
|---|---|---|---|
| 8,296,232 B2 | 10/2012 | Tullis et al. | |
| 9,397,985 B1 | 7/2016 | Seger, II et al. | |
| 10,115,137 B2 | 10/2018 | Ceribelli et al. | |
| 10,135,607 B1 | 11/2018 | Roets | |
| 10,250,381 B1 | 4/2019 | Rice | |
| 10,304,143 B2 | 5/2019 | Kasper et al. | |
| 10,360,191 B2 | 7/2019 | Christidis et al. | |
| 10,387,684 B2 | 8/2019 | Carey et al. | |
| 2017/0011460 A1 | 1/2017 | Molinari et al. | |
| 2017/0358041 A1* | 12/2017 | Forbes, Jr. | G06Q 10/00 |
| 2018/0025435 A1 | 1/2018 | Karame et al. | |
| 2018/0114218 A1 | 4/2018 | Konik et al. | |
| 2018/0225661 A1 | 8/2018 | Russinovich et al. | |
| 2018/0253451 A1 | 9/2018 | Callan et al. | |
| 2018/0349621 A1 | 12/2018 | Schvey et al. | |

(Continued)

FOREIGN PATENT DOCUMENTS

CN    108537667 A    9/2018

*Primary Examiner* — Kim T Nguyen
(74) *Attorney, Agent, or Firm* — Michael A. Springs; Moore & Van Allen PLLC; Seongun M. Hong

(57) ABSTRACT

A system provides for data consensus validation in an electronic distributed server network using a screening node. In particular, a distributed database may be hosted on nodes operated by one or more third party entities. The screening node may retrieve reference data, which may be submitted by one or more reference data providers, from the distributed database to generate executable scripts from the screening algorithms within the reference data. The scripts may in turn be validated by the nodes of the distributed database and subsequently embedded into the distributed database for execution by one or more computing systems within the network environment.

20 Claims, 3 Drawing Sheets

(56) References Cited

U.S. PATENT DOCUMENTS

| | | | |
|---|---|---|---|
| 2018/0352268 A1* | 12/2018 | O'Hanlon | H04N 21/234 |
| 2018/0374062 A1 | 12/2018 | Hunter et al. | |
| 2019/0012595 A1 | 1/2019 | Beser et al. | |
| 2019/0019183 A1 | 1/2019 | Karame et al. | |
| 2019/0058581 A1 | 2/2019 | Wood et al. | |
| 2019/0164220 A1 | 5/2019 | Raj et al. | |
| 2019/0171838 A1 | 6/2019 | Struttmann | |
| 2019/0199787 A1 | 6/2019 | Carver et al. | |
| 2019/0279172 A1 | 9/2019 | Duffield et al. | |
| 2019/0280873 A1 | 9/2019 | Yang | |
| 2019/0287200 A1* | 9/2019 | Schuler | G06Q 50/265 |
| 2019/0296915 A1 | 9/2019 | Lancashire | |
| 2019/0306235 A1 | 10/2019 | Veale et al. | |
| 2019/0312863 A1* | 10/2019 | Chow | H04L 9/0643 |
| 2019/0363874 A1 | 11/2019 | Shirley et al. | |
| 2020/0184556 A1* | 6/2020 | Celia | G06Q 10/0639 |
| 2021/0075791 A1* | 3/2021 | Dunjic | H04L 63/062 |
| 2021/0081397 A1* | 3/2021 | Balaji | G06F 16/27 |

\* cited by examiner

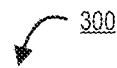

```
┌─────────────────────────────────────────────────────────┐
│ DETECT THAT A PROPOSED DATA RECORD HAS BEEN SUBMITTED TO A │
│ DISTRIBUTED LEDGER, WHEREIN THE PROPOSED DATA RECORD COMPRISES │
│                     REFERENCE DATA                      │
│                         301                             │
└─────────────────────────────────────────────────────────┘
                            ↓
┌─────────────────────────────────────────────────────────┐
│   VALIDATE THE PROPOSED DATA RECORD USING A CONSENSUS ALGORITHM │
│                         302                             │
└─────────────────────────────────────────────────────────┘
                            ↓
┌─────────────────────────────────────────────────────────┐
│   RECEIVE, FROM A USER DEVICE, A REQUEST TO PROCESS A RESOURCE │
│                       TRANSFER                          │
│                         303                             │
└─────────────────────────────────────────────────────────┘
                            ↓
┌─────────────────────────────────────────────────────────┐
│ RETRIEVE, FROM THE DISTRIBUTED LEDGER, AN EXECUTABLE SCRIPT, WHEREIN │
│ THE EXECUTABLE SCRIPT IS GENERATED BY A SCREENING NODE USING THE │
│                     REFERENCE DATA                      │
│                         304                             │
└─────────────────────────────────────────────────────────┘
                            ↓
┌─────────────────────────────────────────────────────────┐
│    EXECUTE THE EXECUTABLE SCRIPT TO GENERATE A SEARCH OUTPUT │
│                         305                             │
└─────────────────────────────────────────────────────────┘
                            ↓
┌─────────────────────────────────────────────────────────┐
│      PROCESS THE RESOURCE TRANSFER BASED ON THE SEARCH OUTPUT │
│                         306                             │
└─────────────────────────────────────────────────────────┘
```

FIG. 3

SYSTEM FOR DATA CONSENSUS VALIDATION IN AN ELECTRONIC DISTRIBUTED SERVER NETWORK USING A SCREENING NODE

FIELD OF THE INVENTION

The present disclosure embraces a system for data consensus validation in an electronic distributed server network using a screening node.

BACKGROUND

Conventional systems and methods for storing reference data face a number of technological challenges. For instance, existing methods for synchronizing reference data among multiple computing systems and/or participants may be prone to errors and/or latency issues. Accordingly, there is a need for an efficient and secure way to host and/or update reference data in real-time or near real-time.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

The present disclosure is directed to a system for data consensus validation in an electronic distributed server network using a screening node. In particular, a distributed database may be hosted on nodes operated by one or more third party entities. The screening node may retrieve reference data, which may be submitted by one or more reference data providers, from the distributed database to generate executable scripts from the screening algorithms within the reference data. The scripts may in turn be validated by the nodes of the distributed database and subsequently embedded into the distributed database for execution by one or more computing systems within the network environment.

Accordingly, embodiments of the present disclosure provide a system for data consensus validation in an electronic distributed server network. The system may comprise a memory device with computer-readable program code stored thereon; a communication device; and a processing device operatively coupled to the memory device and the communication device. The processing device may be configured to execute the computer-readable program code to detect that a proposed data record has been submitted to a distributed ledger, wherein the proposed data record comprises reference data; validate the proposed data record using a consensus algorithm; receive, from a user device, a request to process a resource transfer; retrieve, from the distributed ledger, an executable script, wherein the executable script is generated by a screening node using the reference data; execute the executable script to generate a search output; and process the resource transfer based on the search output.

In some embodiments, the reference data comprises blocklist data, wherein processing the resource transfer comprises detecting a match between an entry within the blocklist data and at least one of the user or a recipient of the resource transfer; connecting, via an application programming interface, to a legacy system associated with the resource transfer; and automatically blocking the resource transfer from being processed.

In some embodiments, the reference data comprises blocklist data, wherein processing the resource transfer comprises detecting no match between an entry within the blocklist data and at least one of the user or a recipient of the resource transfer; connecting, via an application programming interface, to a legacy system associated with the resource transfer; and allowing the resource transfer to be processed.

In some embodiments, the executable script comprises smart contract logic, wherein the smart contract logic comprises a search algorithm for scanning the reference data.

In some embodiments, the search algorithm determines a scan intensity level for the request to process the resource transfer.

In some embodiments, the search output comprises at least one of a name, title, description, or identification number of the user.

In some embodiments, validating the proposed data record via the consensus algorithm comprises receiving an endorsement of the proposed data record from each node within the distributed server network.

Embodiments of the present disclosure also provide a computer program product for data consensus validation in an electronic distributed server network. The computer program product may comprise at least one non-transitory computer readable medium having computer-readable program code portions embodied therein. The computer-readable program code portions may comprise executable code portions for detecting that a proposed data record has been submitted to a distributed ledger, wherein the proposed data record comprises reference data; validating the proposed data record using a consensus algorithm; receiving, from a user device, a request to process a resource transfer; retrieving, from the distributed ledger, an executable script, wherein the executable script is generated by a screening node using the reference data; executing the executable script to generate a search output; and processing the resource transfer based on the search output.

In some embodiments, the reference data comprises blocklist data, wherein processing the resource transfer comprises: detecting a match between an entry within the blocklist data and at least one of the user or a recipient of the resource transfer; connecting, via an application programming interface, to a legacy system associated with the resource transfer; and automatically blocking the resource transfer from being processed.

In some embodiments, the reference data comprises blocklist data, wherein processing the resource transfer comprises detecting no match between an entry within the blocklist data and at least one of the user or a recipient of the resource transfer; connecting, via an application programming interface, to a legacy system associated with the resource transfer; and allowing the resource transfer to be processed.

In some embodiments, the executable script comprises smart contract logic, wherein the smart contract logic comprises a search algorithm for scanning the reference data.

In some embodiments, the search algorithm determines a scan intensity level for the request to process the resource transfer.

In some embodiments, the search output comprises at least one of a name, title, description, or identification number of the user.

Embodiments of the present disclosure also provide a computer-implemented method for data consensus validation in an electronic distributed server network, the method comprising detecting that a proposed data record has been submitted to a distributed ledger, wherein the proposed data record comprises reference data; validating the proposed data record using a consensus algorithm; receiving, from a user device, a request to process a resource transfer; retrieving, from the distributed ledger, an executable script, wherein the executable script is generated by a screening node using the reference data; executing the executable script to generate a search output; and processing the resource transfer based on the search output.

In some embodiments, the reference data comprises blocklist data, wherein processing the resource transfer comprises detecting a match between an entry within the blocklist data and at least one of the user or a recipient of the resource transfer; connecting, via an application programming interface, to a legacy system associated with the resource transfer; and automatically block the resource transfer from being processed.

In some embodiments, the reference data comprises blocklist data, wherein processing the resource transfer comprises detecting no match between an entry within the blocklist data and at least one of the user or a recipient of the resource transfer; connecting, via an application programming interface, to a legacy system associated with the resource transfer; and allowing the resource transfer to be processed.

In some embodiments, the executable script comprises smart contract logic, wherein the smart contract logic comprises a search algorithm for scanning the reference data.

In some embodiments, the search algorithm determines a scan intensity level for the request to process the resource transfer.

In some embodiments, the search output comprises at least one of a name, title, description, or identification number of the user.

In some embodiments, validating the proposed data record via the consensus algorithm comprises receiving an endorsement of the proposed data record from each node within the distributed server network.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
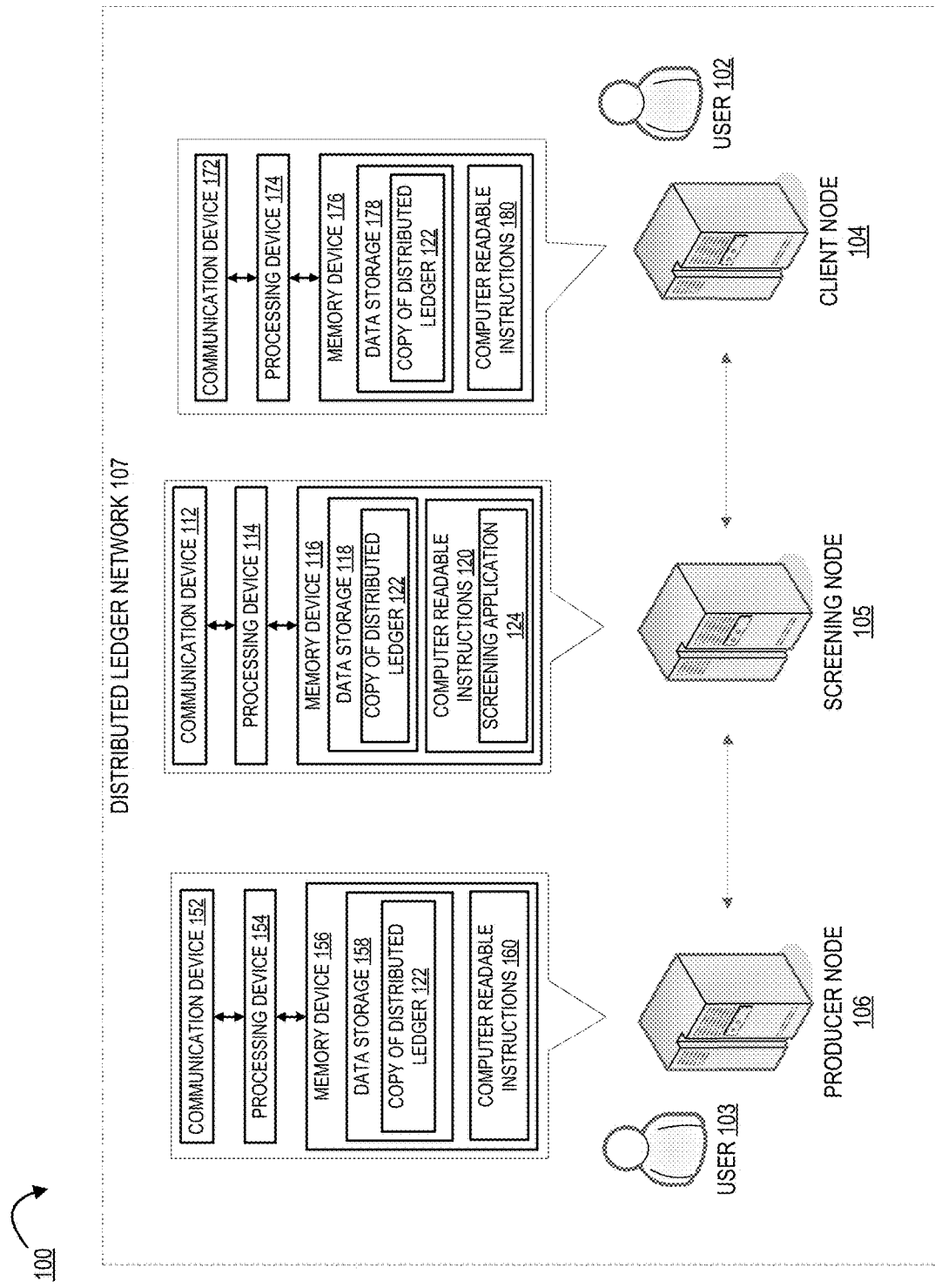
Figure 2:
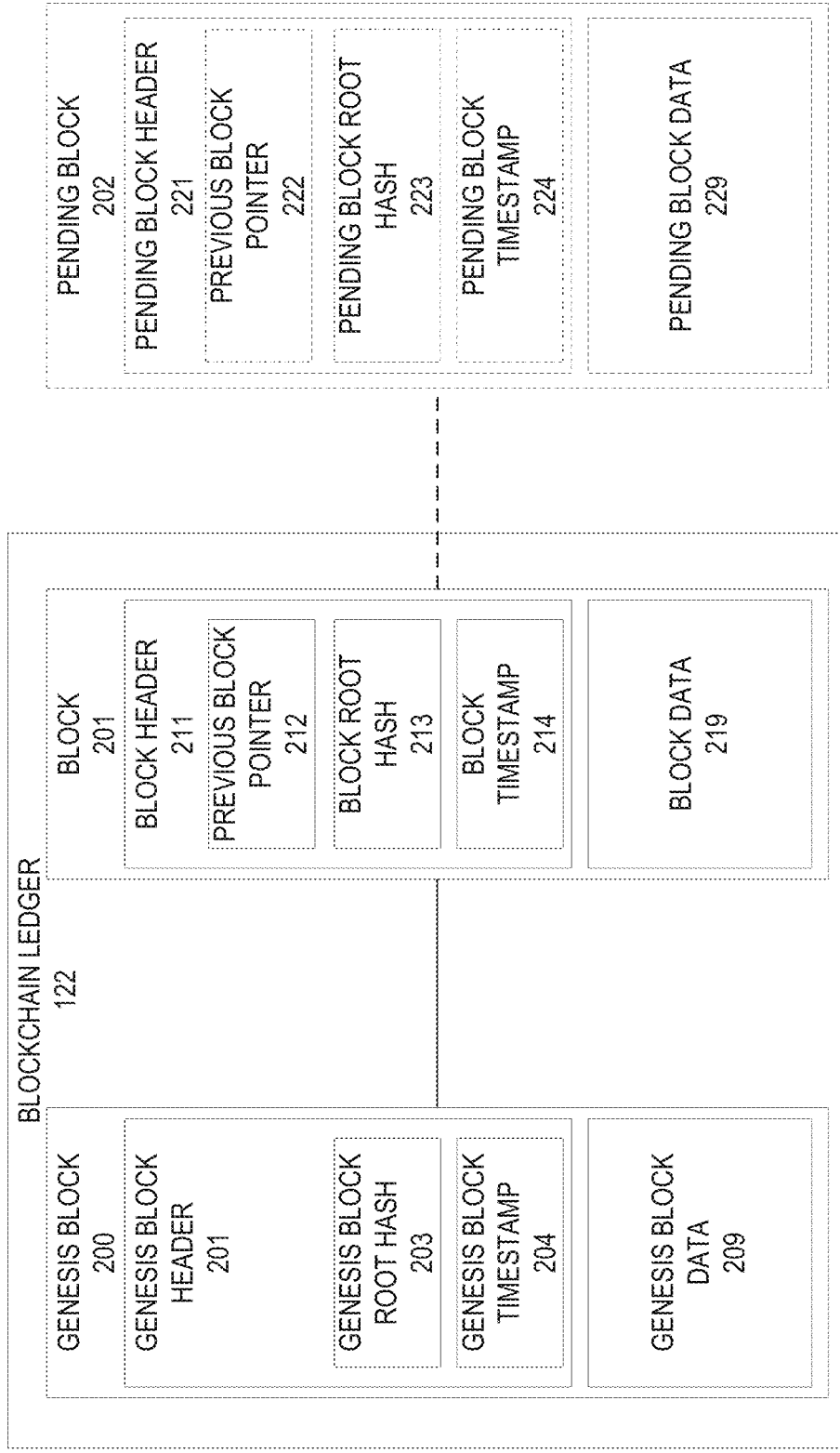

Having thus described embodiments of the invention in general terms, reference will now be made to the accompanying drawings, wherein:

FIG. 1 illustrates an operating environment for the screening distributed ledger system, in accordance with one embodiment of the present disclosure;

FIG. 2 is a block diagram illustrating the data structures within an exemplary blockchain distributed ledger, in accordance with one embodiment of the present disclosure; and FIG. 3 illustrates a process flow for the screening distributed ledger system, in accordance with one embodiment of the present disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" as used herein may refer to an individual or an organization that owns and/or operates an online system of networked computing devices, systems, and/or peripheral devices on which the system described herein is implemented. The entity may be a business organization, a non-profit organization, a government organization, and the like, which may routinely use various types of applications within its enterprise environment to accomplish its organizational objectives.

"Entity system" as used herein may refer to the computing systems, devices, software, applications, communications hardware, and/or other resources used by the entity to perform the functions as described herein. Accordingly, the entity system may comprise desktop computers, laptop computers, servers, Internet-of-Things ("IoT") devices, networked terminals, mobile smartphones, smart devices (e.g., smart watches), network connections, and/or other types of computing systems or devices and/or peripherals along with their associated applications.

"Computing system" or "computing device" as used herein may refer to a networked computing device within the entity system. The computing system may include a processor, a non-transitory storage medium, a communications device, and a display. The computing system may be configured to support user logins and inputs from any combination of similar or disparate devices. Accordingly, the computing system may be a portable electronic device such as a smartphone, tablet, single board computer, smart device, or laptop. In other embodiments, the computing system may be a stationary unit such as a personal desktop computer, networked terminal, IoT device, or the like.

"User" as used herein may refer to an individual who may interact with the entity system to access the functions therein. Accordingly, the user may be an agent, employee, associate, contractor, or other authorized party who may access, use, administrate, maintain, and/or manage the computing systems within the entity system. In other embodiments, the user may be a client or customer of the entity.

Accordingly, as used herein the term "user device" or "mobile device" may refer to mobile phones, personal computing devices, tablet computers, wearable devices, and/or any portable electronic device capable of receiving and/or storing data therein.

"Distributed ledger," or "distributed electronic ledger" as used herein may refer to a structured list of data records that is decentralized and distributed amongst a plurality of computing systems and/or devices. In some embodiments, the distributed ledger may be a blockchain ledger.

"Blockchain" as used herein may refer to a data structure which may comprise a series of sequentially linked "blocks," where each block may comprise data and metadata. The "data" within each block may comprise one or more "data record" or "transactions," while the "metadata" within each block may comprise information about the block, which may include a timestamp, a hash value of data records within the block, and a pointer (e.g., a hash value) to the previous block in the blockchain. In this way, beginning from an originating block (e.g., a "genesis block"), each block in the blockchain is linked to another block via the pointers within the block headers. If the data or metadata within a particular block in the blockchain becomes corrupted or modified, the hash values found in the header of the affected block and/or the downstream blocks may become mismatched, thus allowing the system to detect that the data has been corrupted or modified.

A "blockchain ledger" may refer to a distributed ledger which uses blockchain data structures. Generally, a blockchain ledger is an "append only" ledger in which the data within each block within the blockchain may not be modified after the block is added to the blockchain; data may only be added in a new block to the end of the blockchain. In this way, the blockchain may provide a practically immutable ledger of data records over time.

"Permissioned blockchain" as used herein may refer to a blockchain ledger for which an access control mechanism is implemented such that only known, authorized users may take certain actions with respect to the blockchain ledger (e.g., add new data records, participate in the consensus mechanism, or the like). Accordingly, "unpermissioned blockchain" as used herein may refer to a blockchain ledger without an access control mechanism.

"Private blockchain" as used herein may refer to a blockchain ledger accessible only to users or devices that meet specific criteria (e.g., authorized users or devices of a certain entity or other organization). Accordingly, a "public blockchain" is a blockchain ledger accessible by any member or device in the public realm.

"Node" as used herein may refer to a computing system on which the distributed ledger is hosted. In some embodiments, each node maintains a full copy of the distributed ledger. In this way, even if one or more nodes become unavailable or offline, a full copy of the distributed ledger may still be accessed via the remaining nodes in the distributed ledger system. That said, in some embodiments, the nodes may host a hybrid blockchain such that certain nodes may store certain segments of the blockchain but not others.

"Consensus," "consensus algorithm," or "consensus mechanism" as used herein may refer to the process or processes by which nodes come to an agreement with respect to the contents of the distributed ledger. Changes to the ledger (e.g., addition of data records) may require consensus to be reached by the nodes in order to become a part of the authentic version of the ledger. In this way, the consensus mechanism may ensure that each node maintains a copy of the distributed ledger that is consistent with the copies of the distributed ledger hosted on the other nodes; if the copy of the distributed ledger hosted on one node becomes corrupted or compromised, the remaining nodes may use the consensus algorithm to determine the "true" version of the distributed ledger. The nodes may use various different mechanisms or algorithms to obtain consensus, such as proof-of-work ("PoW"), proof-of-stake ("PoS"), practical byzantine fault tolerance ("PBFT"), proof-of-authority ("PoA"), or the like.

"Smart contract" as used herein may refer to executable computer code or logic that may be executed according to an agreement between parties upon the occurrence of a condition precedent (e.g., a triggering event such as the receipt of a proposed data record). In some embodiments, the smart contract may be self-executing code that is stored in the distributed ledger, where the self-executing code may be executed when the condition precedent is detected by the system on which the smart contract is stored.

Embodiments of the present disclosure provide a system for consensus validation in an electronic distributed ledger network using a screening node. The system may comprise a distributed ledger network in which plurality of nodes host a distributed ledger comprising reference data, where the plurality of nodes may be owned and/or operated by multiple third party entities. Accordingly, the reference data within the distributed ledger may comprise information related to the operation and/or processes of the various third party entities who participate in the hosting and/or maintenance of the distributed ledger network.

In some embodiments, the plurality of nodes may comprise one or more specialized nodes with unique sets of functions within the distributed ledger network. For example, the system may comprise one or more producer nodes which may submit proposed data records to be added to the distributed ledger, where the proposed data records may comprise state changes to the reference data. The system may further comprise one or more client nodes which may, along with the producer nodes, validate the proposed data record via a consensus mechanism. In this regard, the distributed ledger network may be a private distributed ledger network in which the identities of the plurality of nodes are verified and trusted. In some embodiments, the consensus mechanism may require endorsement of the proposed data record by each validator node within the distributed ledger network. In other embodiments, the consensus mechanism may be an algorithm such as a PBFT algorithm. The system may also comprise an ordering service node that may receive validated data records and propagate the data records to the remainder of the nodes within the distributed ledger network.

Each node within the system as described herein may comprise an event listener which may be configured to send and/or receive notifications of significant operations within the distributed ledger network. For instance, an event listener for a particular node may generate a notification when a data record has been proposed and/or validated by other nodes. In this regard, each node may communicate with computing systems outside of the distributed ledger network via an event channel application programming interface ("API") to transmit and receive notifications regarding the events.

The system may further comprise a screening node which generates executable scripts from the reference data stored within the distributed ledger. The screening node may receive inputs from the one or more producer nodes, where the inputs may comprise reference data, screening algorithms, or the like. The inputs may in turn be endorsed and/or validated by the remaining peers in the distributed ledger network, including the client nodes. Based on the inputs provided by the producer nodes, the screening node may generate executable scripts (e.g., smart contracts) and provide the scripts to the client nodes to be incorporated into one or more automated processes of the client nodes. In this way, the screening node may provide an additional layer of abstraction to the participants within the distributed ledger network.

An exemplary embodiment of the present disclosure is provided below for illustrative purposes. In one embodiment, an entity such as a financial institution may wish to prevent the execution of transactions for certain blocklisted users. In such an embodiment, one or more client nodes owned and/or operated by the entity may store an electronic distributed ledger which is shared by one or more producer nodes owned and/or operated by one or more third party producer entities, where the reference data within the distributed ledger may include sanctions data. The sanctions data may comprise a list of blocklisted individuals, organizations, and/or other entities for whom the entity may exclude from transaction processing services, where the list may comprise the information such as a name, title, description, date of birth or creation, identification number, passport number, or other types of identifying information about the blocklisted entities. The sanctions data may be provided and/or maintained by third party producer entities such as state or government entities (e.g., OFAC, EU, or the like).

In some embodiments, the one or more third party producer entities may comprise a sanctions data screening provider that may store screening algorithms that, based on the sanctions data, may contain business or organizational logic with respect to actions taken with respect to the entities and/or parties referenced in the sanctions data. For example, a screening algorithm may provide the logic needed to prevent the execution of transactions on behalf of or with respect to the blocklisted parties as found in the sanctions data. In this regard, the screening algorithm may comprise logic to search for blocklisted parties (e.g., search by name, ID number, date of birth, place of birth, or the like) and/or define the intensity with which a scan for blocklisted parties must be conducted on a per-transaction basis. In such embodiments, a screening node, which also stores a copy of the distributed ledger, may read the sanctions data and screening algorithms from the reference data of the distributed ledger and generate executable scripts to be distributed to the computing systems of the entity. The executable scripts may, for instance, may allow the entity's computing systems to detect transactions involving blocklisted parties (e.g., a blocklisted individual or entity attempts to deposit funds into an account) and automatically prevent the entity's computing systems from processing said transactions. Accordingly, the executable scripts may be embedded as smart contracts within the shared distributed ledger. In some embodiments, the executable scripts/smart contracts may be endorsed by the peer nodes (e.g., the client node, producer node, or the like). In this way, the distributed ledger participants may efficiently reach consensus on the proper execution of transactions.

The system as described herein confers a number of technological advantages over conventional methods of storing reference data. In particular, storing the distributed ledger across all of the nodes within the distributed ledger network allows for automatic real-time or near real-time synchronization of reference data while providing additional layers of security against data tampering or corruption. Furthermore, by using a screening node as described herein, the system may provide an efficient interface for entities to automatically execute processes related to their organizational objectives.

Turning now to the figures, FIG. 1 illustrates an operating environment 100 for the screening distributed ledger system, in accordance with one embodiment of the present disclosure. In particular, FIG. 1 illustrates a screening node 105 that is communicatively coupled with a producer node 106 and a client node 104. The screening node 105, the producer node 106, and the client node 104 may be part of a distributed ledger system 107 in which each node 105, 106, 104 maintains a copy of a distributed ledger as described herein. It should be understood that FIG. 1 illustrates only an exemplary embodiment of the operating environment 100, and it will be appreciated that one or more functions of the systems, devices, or servers as depicted in FIG. 1 may be combined into a single system, device, or server. For instance, although FIG. 1 depicts the producer node 106 and the screening node 105 as separate computing systems, the functions of each may be executed on a single computing system. Furthermore, a single system, device, or server as depicted in FIG. 1 may represent multiple systems, devices, or servers. For instance, though FIG. 1 depicts a single producer node 106 and a single client node 104, the system may comprise multiple producer nodes and client nodes which may each write data to and read data from the distributed ledger.

The network may be a system specific distributive network receiving and distributing specific network feeds and identifying specific network associated triggers. The network include one or more cellular radio towers, antennae, cell sites, base stations, telephone networks, cloud networks, radio access networks (RAN), WiFi networks, or the like. Additionally, the network may also include a global area network (GAN), such as the Internet, a wide area network (WAN), a local area network (LAN), or any other type of network or combination of networks. Accordingly, the network may provide for wireline, wireless, or a combination wireline and wireless communication between devices on the network.

As illustrated in FIG. 1, the screening node 105 may be configured to receive inputs from the producer node 106 (e.g., reference data) and provide outputs to the client node 104 (e.g., executable smart contracts compiled using the reference data). In this regard, the screening node 105 may be, for example, a networked terminal, server, desktop computer, or the like, though it is within the scope of the disclosure for the screening node 105 to be a portable device such as a cellular phone, smart phone, smart device, personal data assistant (PDA), laptop, or the like. The screening node 105 may comprise a communication device 112, a processing device 114, and a memory device 116, where the processing device 114 is operatively coupled to the communication device 112 and the memory device 116. The processing device 114 uses the communication device 112 to communicate with the network and other devices on the network. As such, the communication device 112 generally comprises a modem, antennae, WiFi or Ethernet adapter, radio transceiver, or other device for communicating with other devices on the network.

The memory device 116 comprises computer-readable instructions 120 and data storage 118, where the data storage 118 may comprise a copy of a distributed ledger 122. The distributed ledger (and the copy of the distributed ledger 122) may comprise a series of data records relevant to the objectives of the entity. For instance, the distributed ledger may comprise a series of data records containing reference data (e.g., sanctions data regarding blocklisted entities). The distributed ledger may further comprise executable code (e.g., smart contract logic) created based on the reference data. The smart contract logic may be executed by the various computing systems within the network environment (e.g., the client node 104) to automatically implement certain processes and/or policies based on the reference data (e.g., automatically block transactions from processing if one of the referenced entities is blocklisted).

As further illustrated in FIG. 1, the producer node 106 may comprise a communication device 152, a processing device 154, and a memory device 156. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The communication device 152, and other communication devices as described herein, may comprise a wireless local area network (WLAN) such as WiFi based on the Institute of Electrical and Electronics Engineers' (IEEE) 802.11 standards, Bluetooth short-wavelength UHF radio waves in the ISM band from 2.4 to 2.485 GHz or other wireless access technology. Alternatively or in addition to the wireless interface, the client node 104 may also include a communication interface device that may be connected by a hardwire connection to the resource distribution device. The interface device may comprise a connector such as a USB, SATA, PATA, SAS or other data connector for transmitting data to and from the respective computing system.

The processing device 154 is operatively coupled to the communication device 152 and the memory device 156. The processing device 154 uses the communication device 152 to communicate with the network and other devices on the network, such as, but not limited to the client node 104 and/or the screening node 105. The communication device 152 generally comprises a modem, antennae, WiFi or Ethernet adapter, radio transceiver, or other device for communicating with other devices on the network.

In some embodiments, the producer node 106 may be operated by a user 103. In some embodiments, the user 103 may be an employee of a third party entity (e.g., a government entity or other organization which provides reference data). In this regard, the memory device 156 may have computer-readable instructions 160 stored thereon. In some embodiments, the memory device 156 may further include data storage 158 which may comprise a copy of the distributed ledger 122. The reference data may be stored within the copy of the distributed ledger 122 to be accessed, reviewed, and/or validated by the other nodes (e.g., the screening node 105 and/or the client node 104) within the operating environment 100.

As further illustrated in FIG. 1, the client node 104 may be a computing system which may validate reference data and execute the smart contract logic stored within the distributed ledger. In some embodiments, the client node 104 may be operated by a user 102 such as an administrator or employee of the entity. Accordingly, the client node 104 may also comprise a processing device 174 operatively coupled to the communication device 172 and a memory device 176 comprising data storage 178 and computer readable instructions 180 which may be configured to instruct the processing device 174 to execute certain functions over the network, such as interacting with the screening node 105 and/or the producer node 106. The data storage 178 may comprise a copy of the distributed ledger 122 which may comprise data records of reference data and/or executable scripts created from the reference data. Accordingly, the client node 104 may participate in validation/consensus regarding proposed data records and process the executable scripts to accomplish its objectives.

The communication device 172, and other communication devices as described herein, may comprise a wireless local area network (WLAN) such as WiFi based on the Institute of Electrical and Electronics Engineers' (IEEE) 802.11 standards, Bluetooth short-wavelength UHF radio waves in the ISM band from 2.4 to 2.485 GHz or other wireless access technology. Alternatively or in addition to the wireless interface, the client node 104 may also include a communication interface device that may be connected by a hardwire connection to the resource distribution device. The interface device may comprise a connector such as a USB, SATA, PATA, SAS or other data connector for transmitting data to and from the respective computing system.

The computing systems described herein may each further include a processing device communicably coupled to devices as a memory device, output devices, input devices, a network interface, a power source, a clock or other timer, a camera, a positioning system device, a gyroscopic device, one or more chips, and the like.

In some embodiments, the computing systems may access one or more databases or datastores (not shown) to search for and/or retrieve information related to the service provided by the entity. The computing systems may also access a memory and/or datastore local to the various computing systems within the operating environment 100.

The processing devices as described herein may include functionality to operate one or more software programs or applications, which may be stored in the memory device. For example, a processing device may be capable of operating a connectivity program, such as a web browser application. In this way, the computing systems may transmit and receive web content, such as, for example, product valuation, service agreements, location-based content, and/or other web page content, according to a Wireless Application Protocol (WAP), Hypertext Transfer Protocol (HTTP), and/or the like.

A processing device may also be capable of operating applications. The applications may be downloaded from a server and stored in the memory device of the computing systems. Alternatively, the applications may be pre-installed and stored in a memory in a chip.

The chip may include the necessary circuitry to provide integration within the devices depicted herein. Generally, the chip will include data storage which may include data associated with the service that the computing systems may be communicably associated therewith. The chip and/or data storage may be an integrated circuit, a microprocessor, a system-on-a-chip, a microcontroller, or the like. In this way, the chip may include data storage. Of note, it will be apparent to those skilled in the art that the chip functionality may be incorporated within other elements in the devices. For instance, the functionality of the chip may be incorporated within the memory device and/or the processing device. In a particular embodiment, the functionality of the chip is incorporated in an element within the devices. Still further, the chip functionality may be included in a removable storage device such as an SD card or the like.

A processing device may be configured to use the network interface to communicate with one or more other devices on a network. In this regard, the network interface may include an antenna operatively coupled to a transmitter and a receiver (together a "transceiver"). The processing device may be configured to provide signals to and receive signals from the transmitter and receiver, respectively. The signals may include signaling information in accordance with the air interface standard of the applicable cellular system of the wireless telephone network that may be part of the network. In this regard, the computing systems may be configured to operate with one or more air interface standards, communication protocols, modulation types, and access types. By way of illustration, the devices may be configured to operate in accordance with any of a number of first, second, third, fourth, and/or fifth-generation communication protocols and/or the like. For example, the computing systems may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with fifth-generation (5G) wireless communication protocols, or the like. The devices may also be configured to operate in accordance with non-cellular communication mechanisms, such as via a wireless local area network (WLAN) or other communication/data networks.

The network interface may also include an application interface in order to allow a user or service provider to execute some or all of the above-described processes. The application interface may have access to the hardware, e.g., the transceiver, and software previously described with respect to the network interface. Furthermore, the application interface may have the ability to connect to and communicate with an external data storage on a separate system within the network.

The devices may have an interface that includes user output devices and/or input devices. The output devices may include a display (e.g., a liquid crystal display (LCD) or the like) and a speaker or other audio device, which are operatively coupled to the processing device. The input devices, which may allow the devices to receive data from a user 102, may include any of a number of devices allowing the devices to receive data from a user 102, such as a keypad, keyboard, touch-screen, touchpad, microphone, mouse, joystick, other pointer device, button, soft key, and/or other input device(s).

The devices may further include a power source. Generally, the power source is a device that supplies electrical energy to an electrical load. In some embodiment, power source may convert a form of energy such as solar energy, chemical energy, mechanical energy, or the like to electrical energy. Generally, the power source may be a battery, such as a lithium battery, a nickel-metal hydride battery, or the like, that is used for powering various circuits, e.g., the transceiver circuit, and other devices that are used to operate the devices. Alternatively, the power source may be a power adapter that can connect a power supply from a power outlet to the devices. In such embodiments, a power adapter may be classified as a power source "in" the devices.

As described above, the computing devices as shown in FIG. 1 may also include a memory device operatively coupled to the processing device. As used herein, "memory" may include any computer readable medium configured to store data, code, or other information. The memory device may include volatile memory, such as volatile Random Access Memory (RAM) including a cache area for the temporary storage of data. The memory device may also include non-volatile memory, which can be embedded and/or may be removable. The non-volatile memory may additionally or alternatively include an electrically erasable programmable read-only memory (EEPROM), flash memory or the like.

The memory device may store any of a number of applications or programs which comprise computer-executable instructions/code executed by the processing device to implement the functions of the devices described herein.

The computing systems may further comprise a gyroscopic device. The positioning system, input device, and the gyroscopic device may be used in correlation to identify phases within a service term.

Each computing system may also have a control system for controlling the physical operation of the device. The control system may comprise one or more sensors for detecting operating conditions of the various mechanical and electrical systems that comprise the computing systems or of the environment in which the computing systems are used. The sensors may communicate with the processing device to provide feedback to the operating systems of the device. The control system may also comprise metering devices for measuring performance characteristics of the computing systems. The control system may also comprise controllers such as programmable logic controllers (PLC), proportional integral derivative controllers (PID) or other machine controllers. The computing systems may also comprise various electrical, mechanical, hydraulic or other systems that perform various functions of the computing systems. These systems may comprise, for example, electrical circuits, motors, compressors, or any system that enables functioning of the computing systems.

FIG. 2 is a block diagram illustrating the data structures within an exemplary blockchain distributed ledger, in accordance with some embodiments. In particular, FIG. 2 depicts a plurality of blocks 200, 201 within the blockchain ledger 122, in addition to a pending block 202 that has been submitted to be appended to the blockchain ledger 122. The blockchain ledger 122 may comprise a genesis block 200 that serves as the first block and origin for subsequent blocks in the blockchain ledger 122. The genesis block 200, like all other blocks within the blockchain ledger 122, comprise a block header 201 and block data 209. The genesis block data 209, or any other instances of block data within the blockchain ledger 122 (or any other distributed ledger) may contain one or more data records. For instance, block data may comprise software source code, authentication data, transaction data, documents or other data containers, third party information, regulatory and/or legal data, or the like.

The genesis block header 201 may comprise various types of metadata regarding the genesis block data 209. In some embodiments, the block header 201 may comprise a genesis block root hash 203, which is a hash derived from an algorithm using the genesis block data 209 as inputs. In some embodiments, the genesis block root hash 203 may be a Merkle root hash, wherein the genesis block root hash 203 is calculated via a hash algorithm based on a combination of the hashes of each data record within the genesis block data 209. In this way, any changes to the data within the genesis block data 209 will result in a change in the genesis block root hash 203. The genesis block header 201 may further comprise a genesis block timestamp 204 that indicates the time at which the block was written to the blockchain ledger 122. In some embodiments, the timestamp may be a Unix timestamp. In some embodiments, particularly in blockchains utilizing a PoW consensus mechanism, the block header 201 may comprise a nonce value and a difficulty value. The nonce value may be a whole number value that, when combined with the other items of metadata within the block header 201 into a hash algorithm, produces a hash output that satisfies the difficulty level of the cryptographic puzzle as defined by the difficulty value. For instance, the consensus mechanism may require that the resulting hash of the block header 201 falls below a certain value threshold (e.g., the hash value must start with a certain number of zeroes, as defined by the difficulty value).

A subsequent block 201 may be appended to the genesis block 200 to serve as the next block in the blockchain. Like all other blocks, the subsequent block 201 comprises a block header 211 and block data 219. Similarly, the block header 211 comprise a block root hash 213 of the data within the block data 219 and a block timestamp 214. The block header 211 may further comprise a previous block pointer 212, which may be a hash calculated by combining the hashes of the metadata (e.g., the genesis block root hash 203, genesis block timestamp 204, and the like) within the block header 201 of the genesis block 200. In this way, the block pointer 212 may be used to identify the previous block (i.e., the genesis block 200) in the blockchain ledger 122, thereby creating a "chain" comprising the genesis block 200 and the subsequent block 201.

The value of a previous block pointer is dependent on the hashes of the block headers of all of the previous blocks in the chain; if the block data within any of the blocks is altered, the block header for the altered block as well as all subsequent blocks will result in different hash values. In other words, the hash in the block header may not match the hash of the values within the block data, which may cause subsequent validation checks to fail. Even if an unauthorized user were to change the block header hash to reflect the altered block data, this would in turn change the hash values of the previous block pointers of the next block in the sequence. Therefore, an unauthorized user who wishes to alter a data record within a particular block must also alter the hashes of all of the subsequent blocks in the chain in order for the altered copy of the blockchain to pass the validation checks imposed by the consensus algorithm. Thus, the computational impracticability of altering data records in a blockchain in turn greatly reduces the chance of improper alteration of data records.

A pending block 202 or "proposed block" may be submitted for addition to the blockchain ledger 122. The pending block 202 may comprise a pending block header 221, which may comprise a pending block root hash 223, a previous block pointer 222 that points to the previous block 201, a pending block timestamp 224, and pending block data 229. Once a pending block 202 is submitted to the system, the nodes within the system may validate the pending block 202 via a consensus algorithm. The consensus algorithm may be, for instance, a proof of work mechanism, in which a node determines a nonce value that, when combined with a hash of the block header 211 of the last block in the blockchain, produces a hash value that falls under a specified threshold value. For instance, the PoW algorithm may require that said hash value begins with a certain number of zeroes. Once said nonce value is determined by one of the nodes in the blockchain, the node may post the "solution" to the other nodes in the blockchain. Once the solution is validated by the other nodes, the hash of the block header 211 is included in the pending block header 221 of the pending block 202 as the previous block pointer 222. The pending block header 221 may further comprise the pending block root hash 223 of the pending block data 229 which may be calculated based on the winning solution. The pending block 202 is subsequently considered to be appended to the previous block 201 and becomes a part of the blockchain ledger 122. A pending block timestamp 224 may also be added to signify the time at which the pending block 202 is added to the blockchain ledger 122.

In other embodiments, the consensus mechanism may be based on a total number of consensus inputs submitted by the nodes of the blockchain ledger 122, e.g., a PBFT consensus mechanism. Once a threshold number of consensus inputs to validate the pending block 202 has been reached, the pending block 202 may be appended to the blockchain ledger 122. In such embodiments, nonce values and difficulty values may be absent from the block headers. In still other embodiments, the consensus algorithm may be a Proof-of-Stake mechanism in which the stake (e.g., amount of digital currency, reputation value, or the like) may influence the degree to which the node may participate in consensus and select the next proposed block. In other embodiments, the consensus algorithm may be a Proof-of-Authority mechanism in which the identity of the validator itself (with an attached reputation value) may be used to validate proposed data records (e.g., the ability to participate in consensus/approval of proposed data records may be limited to approved and/or authorized validator nodes). In yet other embodiments, the consensus algorithm may comprise a manual node approval process rather than an automated process.

FIG. 3 illustrates a process flow 300 for the screening distributed ledger system, in accordance with one embodiment of the present disclosure. The process begins at block 301, where the system detects that a proposed data record has been submitted to a distributed ledger, wherein the proposed data record comprises reference data. In one embodiment, the proposed data record may be submitted by a producer node, which may be a computing system that hosts a copy of the distributed ledger and is owned and/or operated by a third party entity (e.g., a regulatory agency, reference data service providers, or the like). In an exemplary embodiment, the reference data may comprise blocklist data (e.g., "sanctions data") which may comprise a list of users or entities who are ineligible from receiving products and/or services provided by the entity. For instance, a blocklisted entity may be prevented from conducting resource transfers (e.g., transactions) through the systems of a particular entity such as a financial institution. In such embodiments, the blocklist data may include data from sanctions lists provided by OFAC, WCL, EU, or other types of agencies and/or reference data service providers.

The process continues to block 302, where the system validates the proposed data record using a consensus algorithm. In some embodiments, each of the nodes which host a copy of the distributed ledger (e.g., producer nodes, client nodes, screening node, or any other node within the network environment) may participate in the validation and/or endorsement of data records on the distributed ledger. The consensus algorithm may be, for instance, a PBFT algorithm in which the nodes may submit consensus inputs on whether to validate a particular data record. In other embodiments, the consensus algorithm may require that each node endorses the data record before the data record is added to the distributed ledger. In this way, the various entities represented in the distributed ledger network may have real-time or near real-time access to a consolidated, consistent repository of reference data.

The process continues to block 303, where the system receives, from a user device, a request to process a resource transfer. Continuing the above example, an entity such as a financial institution may receive a request from a user to conduct a transaction involving the user and a third party entity. For example, the user may request a transfer of resources from the user's account to a third party recipient. As part of the entity's procedure for processing transaction requests, the entity may perform a series of steps which may include verifying the identities of the user and/or the third party recipient against the blocklist data to ensure that blocklisted entities or individuals are prevented from conducting transactions using the entity's products and/or services.

The process continues to block 304, where the system retrieves, from the distributed ledger, an executable script, wherein the executable script is generated by a screening node using the reference data. The executable script may be a smart contract which is embedded within the distributed ledger to allow certain processes to be automatically executed upon the occurrence of certain conditions. For example, the executable script may include search logic or a search algorithm through which the entity may search the reference data for blocklisted entities and/or individuals, where the conditions may include the receipt of a request by a user to conduct transactions or open user accounts. The search algorithm may determine the level of scan intensity required for certain operations processed by the entity. For example, transaction requests over a certain predefined threshold may require a more comprehensive and/or thorough level of scan intensity compared to requests to open an account.

The process continues to block 305, where the system executes the executable script to generate a search output. Continuing the above example, the executable script, when executed, may generate a search output (or search results) based on the reference data. The search output and/or search criteria may include information such as an entity's name, identifier (e.g., ID number), date or place of birth, or the like. In particular, the search output may comprise a list of blocklisted individuals. In other embodiments, the search output may indicate whether any of the relevant parties to a requested transaction (e.g., the user and/or the third party recipient) are blocklisted according to the blocklist data. In executing the script, the system may transfer data (e.g., the search output) with legacy applications and/or systems via an API gateway. In this way, legacy systems which do not have direct access to the distributed ledger (e.g., systems that do not host a copy of the distributed ledger, such as client onboarding apps, transaction processing apps, or the like) may access the search output to drive the necessary processes to complete the transaction.

The process concludes at block 306, where the system processes the resource transfer request based on the search output. If, for instance, the search output indicates a match between the reference data and one or more parties to the requested transaction, the system may automatically block the transaction from being processed. In this regard, the system may communicate with various systems (e.g., back-end servers, applications, or the like) via the API gateway to block the processing of the transaction at each stage (e.g., client onboarding, transaction processing, transaction clearing, or the like). In some embodiments, upon finding a match in the search output, the system may further use event listeners to propagate a notification to the other nodes and/or the affected legacy systems regarding the detection of the blocklisted user or entity. If, on the other hand, the search output does not indicate a match, the system may allow the transaction to be processed. By maintaining the distributed ledger in this way, an entity may incorporate smart contract logic into its organizational process flows in real time to efficiently accomplish its objectives.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EEPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for data consensus validation in an electronic distributed server network, the system comprising:
    a memory device with computer-readable program code stored thereon;
    a communication device; and
    a processing device operatively coupled to the memory device and the communication device, wherein the processing device is configured to execute the computer-readable program code to:
        detect that a proposed data record has been submitted to a distributed ledger, wherein the proposed data record comprises reference data;
        validate the proposed data record using a consensus algorithm;
        receive, from a user device, a request to process a resource transfer;
        retrieve, from the distributed ledger, an executable script, wherein the executable script is generated by a screening node using a screening algorithm and the reference data;
        execute the executable script to generate a search output; and
        process the resource transfer based on the search output.

2. The system according to claim 1, wherein the reference data comprises blocklist data, wherein processing the resource transfer comprises:
    detecting a match between an entry within the blocklist data and at least one of the user or a recipient of the resource transfer;
    connecting, via an application programming interface, to a legacy system associated with the resource transfer; and
    automatically blocking the resource transfer from being processed.

3. The system according to claim 1, wherein the reference data comprises blocklist data, wherein processing the resource transfer comprises:
    detecting no match between an entry within the blocklist data and at least one of the user or a recipient of the resource transfer;
    connecting, via an application programming interface, to a legacy system associated with the resource transfer; and
    allowing the resource transfer to be processed.

4. The system according to claim 1, wherein the executable script comprises smart contract logic, wherein the smart contract logic comprises a search algorithm for scanning the reference data.

5. The system according to claim 4, wherein the search algorithm determines a scan intensity level for the request to process the resource transfer.

6. The system according to claim 1, wherein the search output comprises at least one of a name, title, description, or identification number of the user.

7. The system according to claim 1, wherein validating the proposed data record via the consensus algorithm comprises receiving an endorsement of the proposed data record from each node within the distributed server network.

8. A computer program product for data consensus validation in an electronic distributed server network, the computer program product comprising at least one non-transitory computer readable medium having computer-readable program code portions embodied therein, the computer-readable program code portions comprising executable code portions for:
    detecting that a proposed data record has been submitted to a distributed ledger, wherein the proposed data record comprises reference data;
    validating the proposed data record using a consensus algorithm;
    receiving, from a user device, a request to process a resource transfer;
    retrieving, from the distributed ledger, an executable script, wherein the executable script is generated by a screening node using a screening algorithm and the reference data;
    executing the executable script to generate a search output; and
    processing the resource transfer based on the search output.

9. The computer program product according to claim 8, wherein the reference data comprises blocklist data, wherein processing the resource transfer comprises:
    detecting a match between an entry within the blocklist data and at least one of the user or a recipient of the resource transfer;

connecting, via an application programming interface, to a legacy system associated with the resource transfer; and automatically blocking the resource transfer from being processed.

10. The computer program product according to claim 8, wherein the reference data comprises blocklist data, wherein processing the resource transfer comprises:

detecting no match between an entry within the blocklist data and at least one of the user or a recipient of the resource transfer;

connecting, via an application programming interface, to a legacy system associated with the resource transfer; and allowing the resource transfer to be processed.

11. The computer program product according to claim 8, wherein the executable script comprises smart contract logic, wherein the smart contract logic comprises a search algorithm for scanning the reference data.

12. The computer program product according to claim 11, wherein the search algorithm determines a scan intensity level for the request to process the resource transfer.

13. The computer program product according to claim 8, wherein the search output comprises at least one of a name, title, description, or identification number of the user.

14. A computer-implemented method for data consensus validation in an electronic distributed server network, the method comprising:

detecting that a proposed data record has been submitted to a distributed ledger, wherein the proposed data record comprises reference data;

validating the proposed data record using a consensus algorithm;

receiving, from a user device, a request to process a resource transfer;

retrieving, from the distributed ledger, an executable script, wherein the executable script is generated by a screening node using a screening algorithm and the reference data;

executing the executable script to generate a search output; and processing the resource transfer based on the search output.

15. The computer-implemented method of claim 14, wherein the reference data comprises blocklist data, wherein processing the resource transfer comprises:

detecting a match between an entry within the blocklist data and at least one of the user or a recipient of the resource transfer;

connecting, via an application programming interface, to a legacy system associated with the resource transfer; and automatically blocking the resource transfer from being processed.

16. The computer implemented method of claim 14, wherein the reference data comprises blocklist data, wherein processing the resource transfer comprises:

detecting no match between an entry within the blocklist data and at least one of the user or a recipient of the resource transfer;

connecting, via an application programming interface, to a legacy system associated with the resource transfer; and allowing the resource transfer to be processed.

17. The computer-implemented method of claim 14, wherein the executable script comprises smart contract logic, wherein the smart contract logic comprises a search algorithm for scanning the reference data.

18. The computer-implemented method of claim 17, wherein the search algorithm determines a scan intensity level for the request to process the resource transfer.

19. The computer-implemented method of claim 14, wherein the search output comprises at least one of a name, title, description, or identification number of the user.

20. The computer-implemented method of claim 14, wherein validating the proposed data record via the consensus algorithm comprises receiving an endorsement of the proposed data record from each node within the distributed server network.

* * * * *